United States Patent
Takei et al.

(10) Patent No.: US 6,845,725 B2
(45) Date of Patent: Jan. 25, 2005

(54) METHOD FOR SEWING TOGETHER COVERING ELEMENTS ADAPTED TO UNDERGO FOAMING PROCESS

(75) Inventors: Yoshiyuki Takei, Tokyo (JP); Mineji Kitta, Tokyo (JP); Kiyoshi Kawasaki, Tokyo (JP)

(73) Assignee: Tachi-s Co., Ltd, Tokyo (JP)

( * ) Notice: Subject to any disclaimer, the term of this patent is extended or adjusted under 35 U.S.C. 154(b) by 0 days.

(21) Appl. No.: 10/733,202

(22) Filed: Dec. 11, 2003

(65) Prior Publication Data

US 2004/0154511 A1 Aug. 12, 2004

(51) Int. Cl.[7] ............................................. D05B 23/00
(52) U.S. Cl. ............................ 112/475.08; 112/475.17; 112/470.27
(58) Field of Search ................... 112/475.01, 475.08, 112/475.17, 470.27, 222, 224; 29/91, 91.1, 91.5, 91.7

(56) References Cited

U.S. PATENT DOCUMENTS

| | | | | |
|---|---|---|---|---|
| 5,873,318 A | * | 2/1999 | Bohlinger et al. | 112/475.08 |
| 5,961,019 A | * | 10/1999 | Gleason et al. | 224/643 |
| 6,006,965 A | * | 12/1999 | Hamann | 223/102 |
| 6,401,643 B2 | | 6/2002 | Iida | |
| 6,505,570 B1 | * | 1/2003 | Sakamoto et al. | 112/470.27 |

FOREIGN PATENT DOCUMENTS

| | | |
|---|---|---|
| JP | 08-243271 | 9/1996 |
| JP | 08-309765 | 11/1996 |

* cited by examiner

*Primary Examiner*—Ismael Izaguirre
(74) *Attorney, Agent, or Firm*—Browdy and Neimark, P.L.L.C.

(57) ABSTRACT

A method for sewing together covering elements is provided, in which two first threads and a second thread are used in a sewing machine having sewing needle means. In operating the sewing machine, the covering elements are fed at a given feeding pitch, such that the two first threads are entwined about the second thread in each of needle holes formed by the sewing needle means in the covering elements. Those entwined three threads fill and close the needle hole, thereby preventing leakage of a liquid foaming agent at a foaming process for forming a foamed product integral with the covering elements. The sewing needle means may comprise one sewing needle, in which case, both two first threads are used in that one sewing needle, or alternatively may comprises two sewing needles, in which case, the two first sewing threads are respectively used in the two sewing needles.

6 Claims, 5 Drawing Sheets

METHOD FOR SEWING TOGETHER COVERING ELEMENTS ADAPTED TO UNDERGO FOAMING PROCESS

BACKGROUND OF THE INVENTION

1. Field of the Invention

The present invention relates to a method for sewing together a plurality of separate covering elements that are adapted to undergo a foaming process where a resultant sewn three-dimensional trim cover assembly formed by the covering elements is subjected to foaming with a liquid foaming agent into an integral foamed product.

2. Description of Prior Art

As well known, most of vehicle seats are provided with headrests, armrests or the like. Those equipments for vehicle seat are formed by the steps of providing a plurality of covering elements each preformed in a given shape, sewing them together by a sewing machine into a three-dimensional trim cover assembly, and thereafter injecting a liquid foaming agent into the trim cover assembly, followed by a foaming process where the liquid foaming agent is inflated and cured integrally with the trim cover assembly. In that manner, there is produced a foamed product integral with the trim cover assembly, such as headrest or armrest, wherein the trim cover assembly is integral with a foam padding created therein.

However, during the step of foaming process, it has been frequently the case that a liquid foaming agent is leaked out through needle holes formed by a sewing needle of sewing machine in the trim cover assembly. Hitherto, various attempts have been made to solve such problem. For example, the Japanese Laid-Open Patent Publication No. 8-309765 proposes to effect an overlock sewing along the extreme ends of juxtaposed cover materials, thereby providing an intricately tangled threads around holes formed by a sewing needle along seam with a view to preventing leakage of liquid foaming agent therethrough. The Japanese Laid-Open Patent Publication No. 8-243271 discloses using an elastic filler material along a seam in juxtaposed cover materials. According thereto, the elastic filler material is placed along a given sewing line on the juxtaposed cover materials and a sewing is effected along those juxtaposed filler material and cover materials, so that the elastic filler material is inserted and filled in each of holes formed by a sewing needle along seam in order to prevent leakage of liquid foaming agent therethrough. Further, as disclosed in the U.S. Pat. No. 6,401,643, two different threads are used in a sewing machine for sewing together the cover materials, wherein one of the threads is large in thickness relative to another of them, thereby serving as a leakage preventive member in addition to being a thread.

Nonetheless, the foregoing prior arts have been with the problem that they still require additional separate sewing mechanisms and other separate materials or different threads, thus resulting in troublesome inefficient sewing processes and increased costs of required materials and threads.

SUMMARY OF THE INVENTION

In view of the above-stated drawbacks, it is a purpose of the present to provide an improved method for sewing together separate covering elements adapted to undergo a foaming process for forming a foamed product integral with the covering elements, which is simplified in sewing process and operation.

In order to accomplish such purpose, the method in accordance with the present invention basically comprises the steps of:

providing a sewing machine having a sewing needle means;

providing two first threads;

providing a second thread; and operating the sewing machine so as to feed at least two covering elements at a predetermined feeding pitch in a feeding direction to the sewing needle means and insert the two first threads into each of needle holes formed by the sewing needle means in the at least two covering elements, such that the two first threads are entwined with the second thread within each of needle holes, thereby sewing together the at least two covering elements.

Preferably, the foregoing predetermined feeding pitch is set to be 4 mm or less.

In one aspect of the present invention, the sewing needle means may comprise one sewing needle having an eye therein, and the method may include the steps of: passing both two first threads through the eye of one sewing needle; and then operating the sewing machine so as to insert both two first threads into each of needle holes during the step of operating the sewing machine.

In another alternative aspect of the present invention, the sewing needle means may comprise first and second sewing needles, each having an eye therein, and the first and second sewing needles are disposed along the feeding direction and a distance between the first and second sewing needles is equal to the predetermined feeding pitch, so that, in operating the sewing machine, the afore-said each needle hole is first formed by the first sewing needle, and thereafter, the second sewing needle is inserted into such each needle hole. In this respect, the method may include the steps of: passing one of the two first threads through the eye of the first sewing needle, while passing another of the two first threads through the eye of the second sewing needles; and then operating the sewing machine such that the one of the two first threads is inserted into the each needle hole formed by the first sewing needle and entwined with the second thread therein, after which, the second sewing needle is inserted into the afore-said each needle hole in which the one of the two first threads has been entwined with the second thread, thereby causing the said another of the two first threads to entwine with the second thread therein.

Other features and advantages of the present invention will become apparent from reading of descriptions, hereinafter, with reference to the annexed drawings.

DETAILED DESCRIPTION OF PREFERRED EMBODIMENTS OF THE INVENTION

Referring to FIGS. 1 through 11, there are illustrated preferred exemplary modes of methods for sewing together cover elements in accordance with the present invention. Namely, first and second exemplary modes are respectively shown in one set of FIGS. 1 to 4 and another set of FIGS. 5 to 10, but it should be understood that those two modes are suggested by way of example within the gist and scopes of the present invention and therefore common to each other in terms of using two threads and setting a predetermined feeding pitch to accomplish the purposes of the present invention, as will become appreciable hereinafter.

Figure 1:
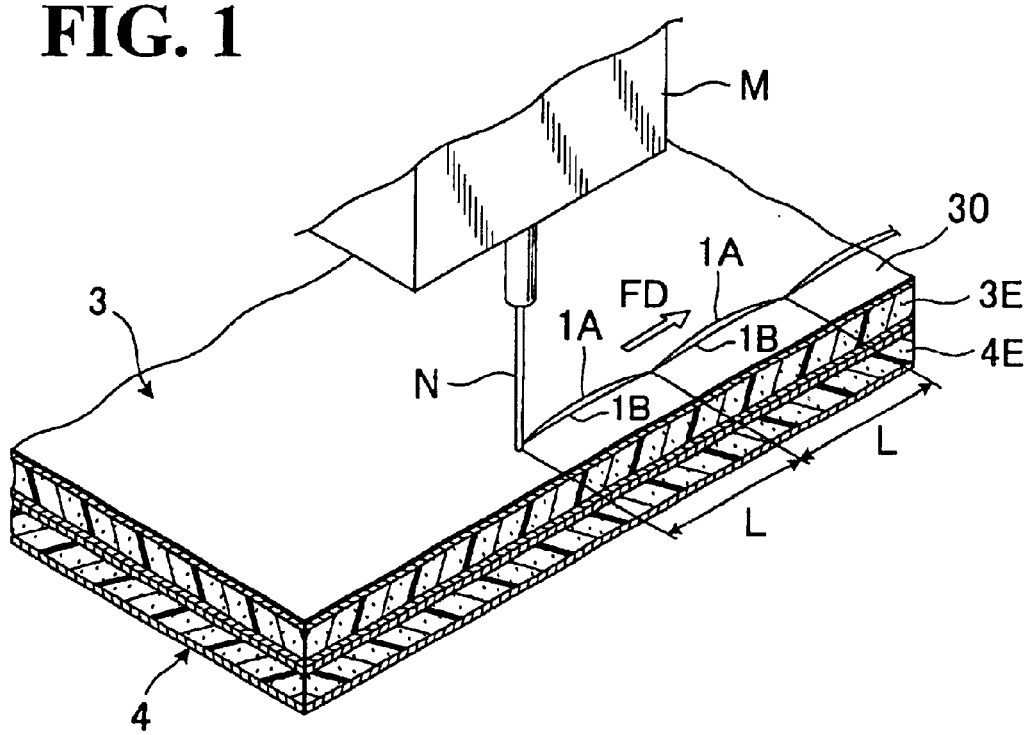
FIG. 1 is a partly broken perspective view showing a first mode of sewing method in accordance with the present invention.
Figure 3:
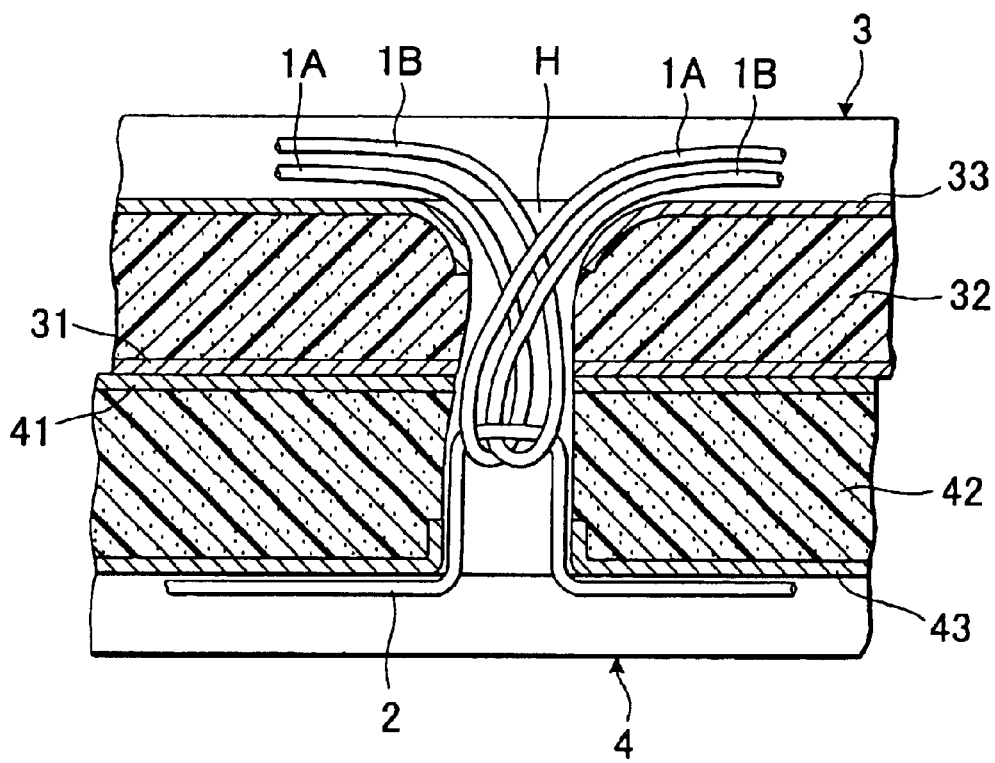
FIG. 3 is a sectional view showing the state where two first threads are entwined with a second thread within a needle hole in accordance with the first mode of sewing method.

At first, as shown in FIG. 1, first and second covering elements (3) (4) are provided and juxtaposed with each other. The illustrated two covering elements (3) (4) are each of a tow-layer lamination structure. Namely, as best shown in FIG. 3, the first covering element (3) has a surface cover layer (31) and an inner foam wadding layer (32) (e.g. a slab urethane foam), both of which are formed integrally together. Likewise formed is the second covering element (4) which has an integral lamination of a surface cover layer (41) and an inner foam padding layer (42) as well. Each of the cover elements (3) (4) is formed from such material as a textile fabric, a non-woven fabric or a knitted fabric, and trimmed in a predetermined shape in advance, considering a resultant desired configuration of trim cover assembly. Designations (33) and (43) each denotes a cured film layer which is formed by heat fusing and curing on outer surface of the corresponding foam padding layer (32 or 42). Those film layers (33) and (43) serve to prevent impregnation of a liquid foaming agent into the corresponding foam padding layers (32) (42) during a foaming process where a liquid foaming agent is to be contacted with them, as known in the art. Of course, in place of such formation of film layers (33) (43), any other suitable materials and members may be laminated on the foam padding layers (32) (42) for that impregnation preventive purpose.

Designation (M) denotes a known sewing machine. As can be seen from FIG. 2, the sewing machine (M) has a sewing needle (N) in the upper body portion thereof and a bobbin (B) provided in the table (T) thereof. As is known, in operation, one thread (the so-called "needle thread") is fed from the sewing machine (M) to the sewing needle (N) in the downward direction, while another thread (the so-called "bobbin thread") is fed from the bobbin (B) upwardly to such needle thread, so as to effect sewing to a material. As shown, formed in the sewing needle (N) is a needle's eye (Nh) for allowing the needle thread to be passed therethrough. On the other hand, the bobbin thread is wound about the bobbin (B). Hereinafter, the needle and bobbin threads shall be referred to as "first thread" and "second thread", respectively, in a generic way for the sake of the present invention.

Now, reference is made to FIGS. 1 to 4 which show a first mode of method of the present invention for sewing together the first and second covering elements (3) (4), using the foregoing conventional sewing machine (M).

Figure 2:
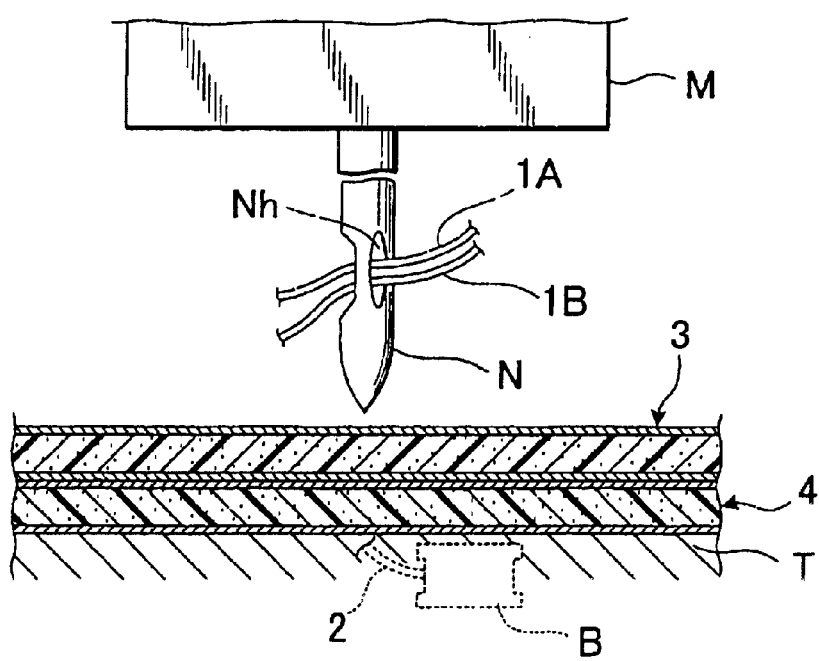
FIG. 2 is a partly broken fragmentary sectional view showing a principal part of the fist mode of sewing method shown in FIG. 1.

According to the present mode, as shown in FIG. 2, a pair of first threads (1A) (1B) and one second thread (2) are used in the sewing machine (M). The first and second threads (1A,1B) (2B) are known threads and identical to one other in terms of diameter and property. As far as the present embodiment is concerned, each of the two first threads (1A) (1B) may be a suitable thread for sewing together the afore-said two covering elements (3) (4) (preferably, it may be a yarn-count "No. 8" polyester thread). The second thread (2) is also identical to the two first threads (1A) (1B) in terms of diameter and property, and may preferably be a yarn-count "No. 8" polyester thread. Hence, all the first and second threads (1A) (1B) (2) used are one and the same thread.

As in FIG. 2, both two first threads (1A) (1B) pass through the eye (Nh) of sewing needle (N).

As shown in FIGS. 1 and 2, the second covering element (4) is placed on the table (T), and then, the first covering element (3) is juxtaposed on the second covering element (4), such that a certain margin (30) to seam is given between a position of the sewing needle (N) and the end (3E) of first covering element (3), while a likewise margin (40) given between the position of sewing needle (N) and the end (4E) of second covering elements (4).

Then, upon operation of the sewing machine (M), the juxtaposed two covering elements (3) (4) are fed in the arrow direction (FD) in FIG. 1 and sewn together by the sewing needle (N) at even intervals as indicated by (L). In this regard, needles to mention, a know feeding means such as feed dog member (not shown) provided in the sewing machine (M) is moved at a fixed stroke corresponding to such even intervals (L). Namely, this is a feeding pitch (L) that can be adjusted by a feeding pitch adjustment device (not shown) provided in the sewing machine (M). In accordance with the present invention, the feeding pitch (L) is preferably set to be 4 mm or less. Under such feeding pitch (L), as understandable from FIG. 3, both two first threads (1A) (1B) are entwined with or about the second thread (2) tight enough to prevent any gap from being created among those particular threads (1A, 1B and 2) within the needle hole (H) formed by the sewing needle (N1) through the juxtaposed first and second covering elements (3) (4). Further, the three entwined threads (1A) (1B) (2) in the aggregate create a clump of threads enough to fill the needle hole (H). In addition thereto, the penetrated and opened portions of foam wadding layers (32) and (42) respective of the two covering elements (3) (4), which correspond to the needle hole (H), tend to resiliently embrace the clump of threads (1A) (1B) (2) so as to forcibly fill and close any small gap between those particular threads (1A) (1B) (2) and the needle hole (H).

In this context, experiments show that, when the feeding pitch (L) is set to be more than 4 mm, the entwining of the two first threads (1A) (1B) with the second thread (2) becomes loosened and is not so tight as to completely close and seal the needle hole (H), which will result in leakage of a liquid foaming agent through the needle hole (H) at a subsequent foaming process that will be explained later.

Figure 4:
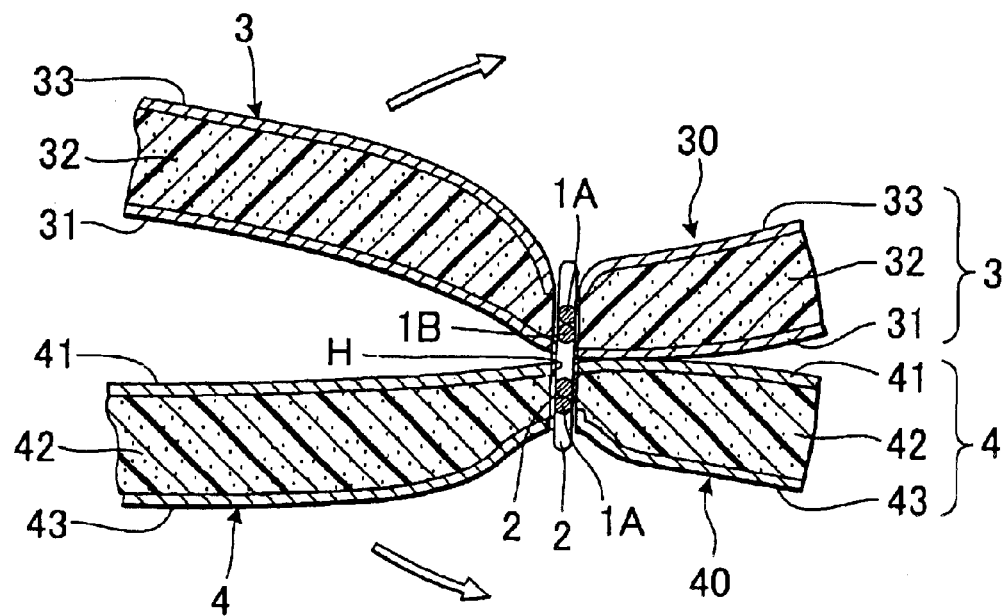
FIG. 4 is a fragmentary sectional view for explanatorily showing the step wherein first and second covering elements are turned over relative to a sewn potion formed by the sewing method of the present invention in order to form a trim cover assembly.

After completion of the sewing operation, as shown in FIG. 4, the first and second covering elements (3) (4) are turned over relative to a sewn portion or the sewn threads (1A) (1B) (2) in a direction to the margins (30) (40) as indicated by the arrows.

Figure 11:
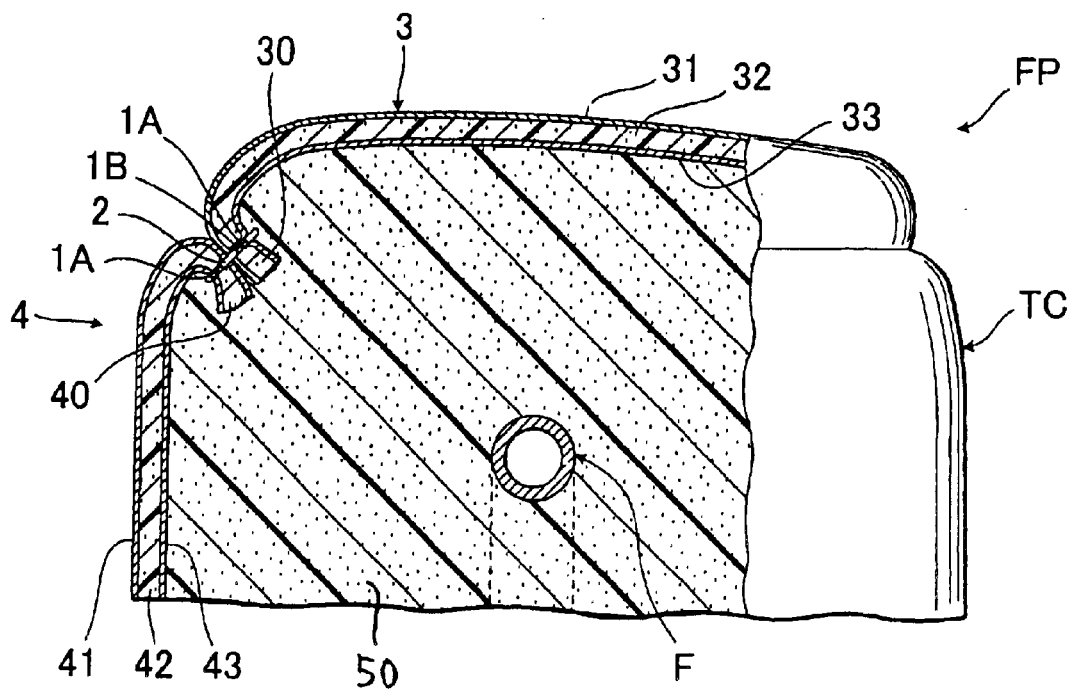
FIG. 11 is a partly broken sectional view of a foamed product integral with a trim cover assembly formed by in either of the first and second modes of sewing method of the present invention.

In that way, a plurality of other covering elements similar to the first and second covering elements (3) (4) are sewn together and turned over relative to their respective margins or sewn portions and also sewn with the forgoing turned-over covering elements (3) (4) so as to form a three-dimensional trim cover assembly which can be seen from the designation (TC) in FIG. 11, for instance.

Thereafter, while not shown, the resultant trim cover assembly (TC) is subjected to a known foaming process using suitable foaming dies, which involves the steps of injecting a liquid foaming agent into the inside of the three-dimensional trim cover assembly (TC) and curing the liquid foaming agent to form an increased mass of foam padding (50) in the trim cover assembly (TC). At this moment, the fact that the entangled threads (1A) (1B) (2) completely fill and seal the needle hole (H) insures to prevent the liquid foaming agent from being leaked therefrom. After completion of the foaming process, there is produced a foamed product (FP), as shown in FIG. 11, which comprises the foam padding (50) and the trim cover assembly (TC). Designation (F) denotes a frame provided in the foamed product (FP). The resultant foamed product (FP) may be an armrest, a headrest, or other kind of article for use with an automotive seat.

Accordingly, it is appreciated that, in accordance with the present invention, a worker has only to use two conventional same threads (1A) (1B) in one sewing needle (N) of a known sewing machine and set the feeding pitch (L) at within a range of 4 mm in order to prevent leakage of a liquid foaming agent as described above. This surely simplifies the sewing process and requires no other special device and means, thus reducing costs involved.

Now, reference is made to FIGS. 5 to 10 which show a second alternative mode of the present invention. This second mode is basically identical to the foregoing first mode, except that first and second sewing needles (N1) and (N2) are employed. Thus, all like designations to be used hereinafter correspond to all like designations that have been given in the first mode described above, and a detailed description is omitted about the common elements and parts between the first and second modes for the sake of simplicity in description.

Figure 5:
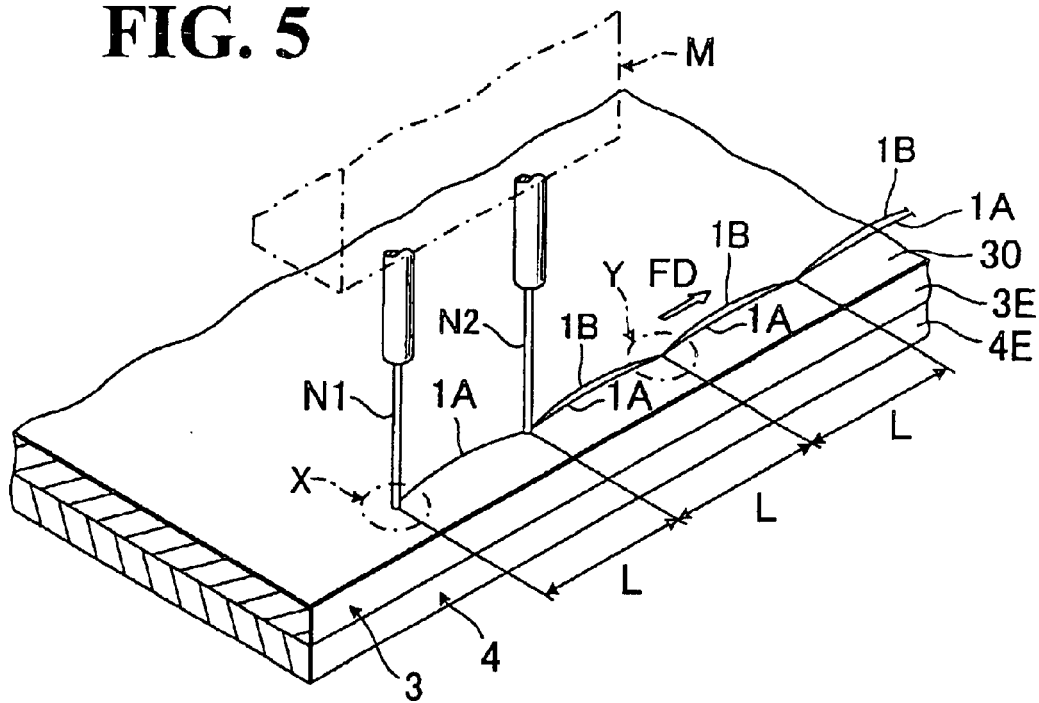
FIG. 5 is a partly broken perspective view showing a second alternative mode of sewing method in accordance with the present invention.

As shown in FIG. 5, a pair of spaced-apart first and second sewing needles (N1) (N2) are provided above the sewing machine table (T). The two sewing needles (N1) (N2) may be operatively mounted in the known sewing machine (M) so that, upon operation of the sewing machine (M), both two sewing needles (N1) (N2) are simultaneously moved vertically toward and away from the table (T). In this operation of sewing machine (M), needles to mention, a know feeding means such as a feed dog member (not shown) provided in the sewing machine (M) is moved at a fixed stroke corresponding to a predetermined feeding pitch (L) as stated in the first mode above. In this regard, a distance (L) between those first and second needles (N1) (N2) is equal to the feeding pitch (L) in order for the second needle (N2) to be concentrically aligned with a needle hole (H) formed by the first needle (N1) during sewing operation as will be explained. Likewise as in the fist mode, the distance or feeding pitch (L) is preferably set to be 4 mm or less to insure that the two first threads (1A) (1B) are entwined about the second thread (2) tight enough to prevent any gap from being created among those three threads within the needle hole (H). Also, likewise as in the first mode, the first and second threads (1A) (1B) (2) used are known threads and identical to each other in terms of diameter and property. Namely, they are one and the same thread and may preferably be a yarn-count "No. 8" polyester thread.

Figure 6:
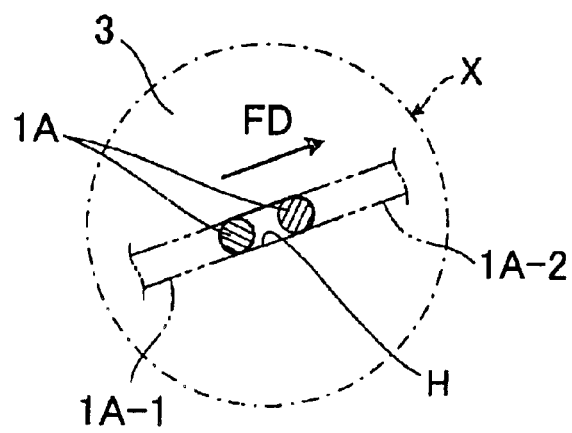
FIG. 6 is an enlarged sectional view fragmentary in part, which corresponds to the portion indicated by X in FIG. 5.
Figure 7:
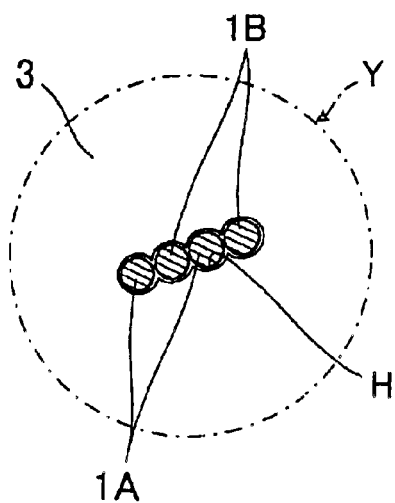
FIG. 7 is an enlarged sectional view fragmentary in part, which corresponds to the portion indicated by Y in FIG. 5.
Figure 8:
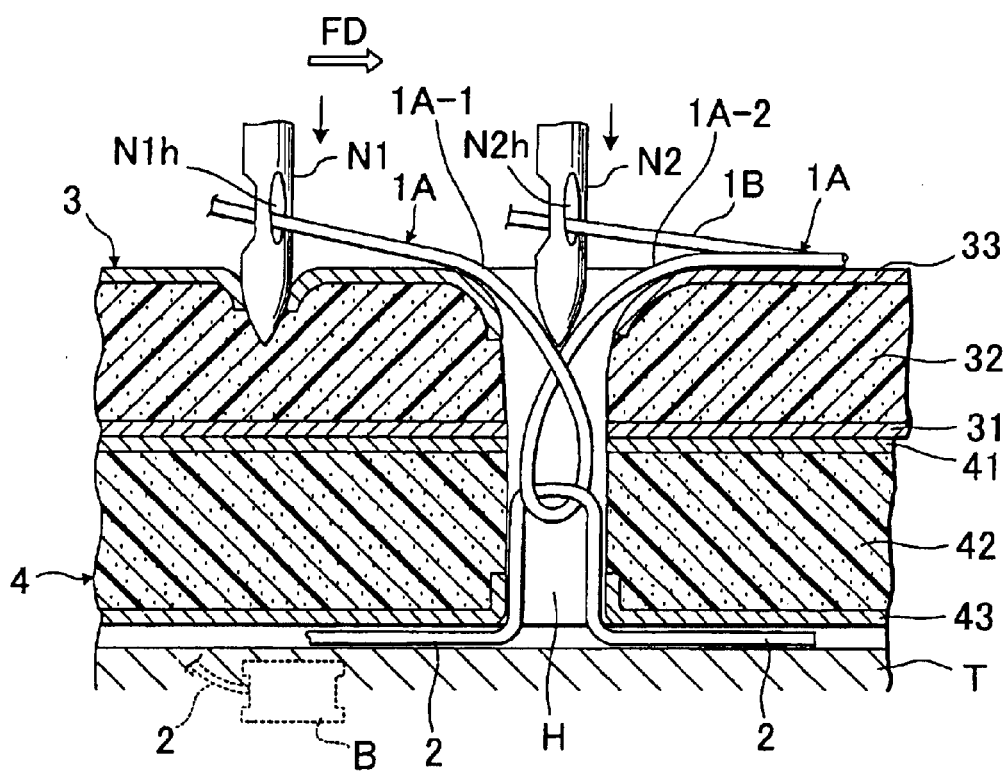
FIG. 8 is a partly broken fragmentary sectional view showing a principal part of the second mode of sewing method shown in FIG. 5.

As shown in FIG. 8, the first thread (1A) passes through the eye (N1h) of the first needle (N1), while the second thread (1B) passes through the eye (N2h) of the second needle (N2). In operation, both first thread (1A) and first needle (N1) are penetrated through the juxtaposed first and second covering elements (3) (4), so that the first thread (1A) is entwined with or about the second thread (2) being fed from the bobbin (B). Thus, it is seen that the entwined first and second threads (1A) (2) are located within the needle hole (H). Further, the first thread (1A), because of its being wound about the second thread (2), is divided into one stitch thread region (1A-1) and another stitch thread region (1A-2) in relation to the needle hole (H). At this moment, since the two covering elements (3) (4) are being fed on the table (T) in the feeding direction (FD), those two stitch thread regions (1A-1) and (1A-2) are stretched in a direction opposite to each other along the feeding direction (FD), with the result that, as indicated in FIG. 6, the needle hole (H) is stretched and elongated along the feeding direction (FD) to assume an elongated needle hole. Consequently, a space is created between the two stitch thread regions (1A-1) (1A-2) within so elongated hole (H), as can be seen from FIG. 6.

Figure 9:
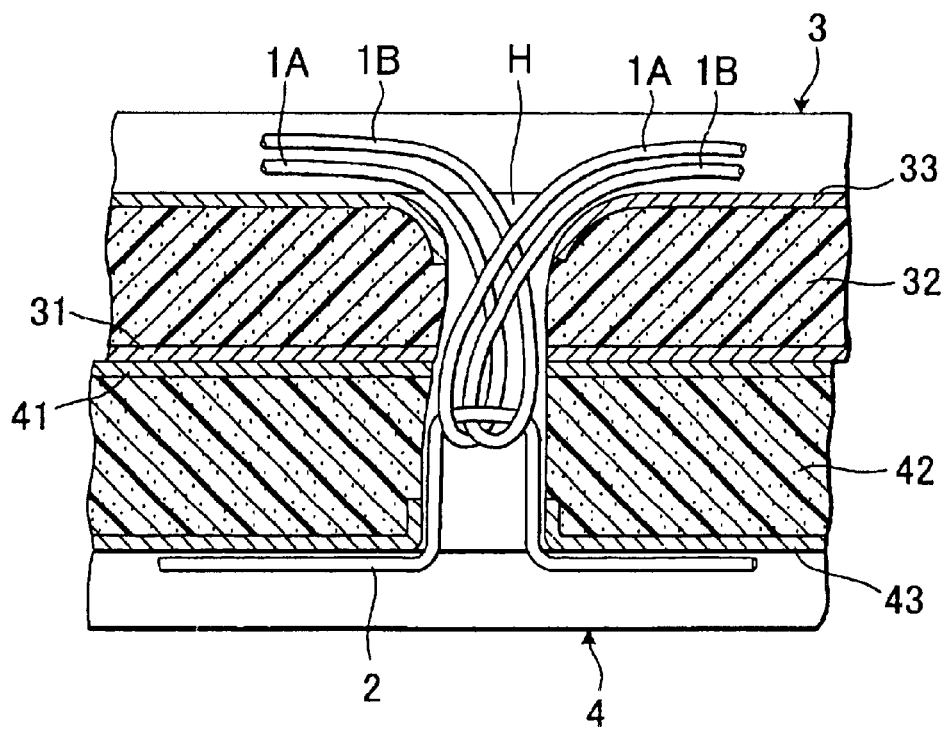
FIG. 9 is a sectional view showing the state where two first threads are entwined with a second thread within a needle hole in accordance with the first mode of sewing method.

Then, the thus-formed one stitch (at H) is displaced to a point right under the second needle (N2) at the feeding pitch (L), and the second sewing needle (N2) is inserted into the elongated needle hole (H) as well as into the afore-stated space between the two stitch thread regions (1A-1) (1A-2), so that the another first thread (1B) is entwined about the second thread (2). Accordingly, as shown in FIG. 9, likewise as in the first mode, both two first threads (1A) (1B) are entwined about the second thread (2), and therefore, as understandable from FIG. 7, the three entwined threads (1A) (1B) (2) in the aggregate fill the needle hole (H), and further, the penetrated and opened portions of foam wadding layers (32) and (42) respective of the two covering elements (3) (4), which correspond to the needle hole (H), tend to resiliently embrace the two first threads (1A) (1B) so as to fill and close any small gap between those particular threads (1A) (1B) and the needle hole (H).

Figure 10:
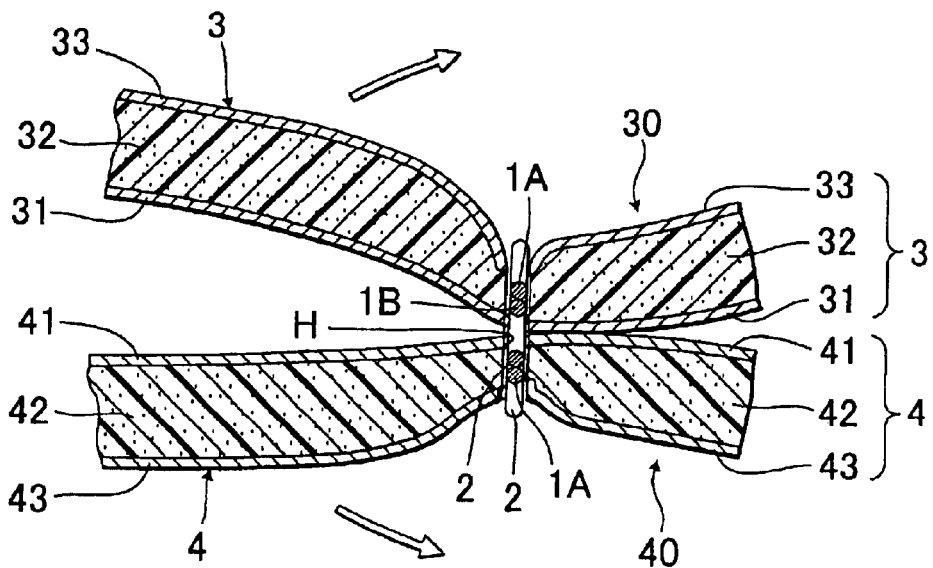
FIG. 10 is a fragmentary sectional view for explanatorily showing the step wherein first and second covering elements are turned over relative to a sewn potion formed by the sewing method of the present invention in order to form a trim cover assembly.

After completion of the sewing operation, as shown in FIG. 10, the first and second covering elements (3) (4) are turned over relative to a sewn portion or the sewn threads (1A) (1B) (2) in a direction to the margins (30) (40) as indicated by the arrows.

In that way, a plurality of other covering elements similar to the first and second covering elements (3) (4) are sewn together and turned over relative to their respective margins or sewn portions and also sewn with the forgoing turned-over covering elements (3) (4) so as to form a three-dimensional trim cover assembly which can be seen from the designation (TC) in FIG. 11, for instance.

Thereafter, as described in the first mode, the resultant trim cover assembly (TC) is subjected to a known foaming process, and thus, no further specific description is omitted thereon. In the present mode also, since the entwined threads (1A) (1B) (2) completely fill and seal the needle hole (H), a liquid foaming agent is positively prevented from being leaked from the needle hole (H). After the foaming process, there is produced a foamed product (SP), as shown in FIG. 11, which comprises the foam padding (50) and the trim cover assembly (TC). Of course, the resultant foamed product (FP) may be an armrest, a headrest, or other kind of article for use with an automotive seat.

Accordingly, it is appreciated that, in accordance with the present invention, two conventional sewing needles (N1) (N2) are only used in a known sewing machine and a worker has only to insert two threads (1A) (1B) through the respective two needles (N1) (N2) and set the feeding pitch (L) between the two needles (N1) (N2) at within a range of 4 mm. Obviously, this simplifies the sewing process and requires no other special device and means in order to prevent leakage of liquid foaming material as describe above, which effectively reduces costs involved.

While having described the present invention so far, it should be understood that the invention is not limited to the illustrated embodiments, and any other modification, replacement and addition may be applied thereto methodologically without departing from the scopes of the appended claims.

What is claimed is:

1. A method for sewing together at least two covering elements designed to undergo a foaming process for forming a foamed product integral with said at least two covering elements, comprising the steps of:

providing a sewing machine having a sewing needle means;

providing two first threads;

providing a second thread; and operating said sewing machine so as to feed said at least two covering elements at a predetermined feeding pitch in a feeding direction to said sewing needle means and insert said two first threads into each needle hole formed by said sewing needle means in said at least two covering elements, such that said two first threads are entwined about said second thread within said each needle hole, thereby sewing together said at least two covering elements.

2. The method as claimed in claim 1, wherein said predetermined feeding pitch is set to be 4 mm or less.

3. The method as claimed in claim 1, wherein said two first threads and said second thread are identical to one another.

4. The method as claimed in claim 1, wherein said sewing needle means comprises one sewing needle having an eye therein, and wherein said method includes the steps of: passing both said two first threads through said eye of said one sewing needle; and then operating said sewing machine so as to insert said two first threads into said each needle hole and cause both said two first threads to entwine about said second thread during the step of operating said sewing machine.

5. The method as claimed in claim 1, wherein said sewing needle means comprises first and second sewing needles, each having an eye therein, wherein said first and second sewing needles are disposed along said feeding direction and a distance between said first and second sewing needles is equal to said predetermined feeding pitch, so that, in operating said sewing machine, said each needle hole is first formed by said first sewing needle, and thereafter, said second sewing needle is inserted into said each needle hole in a concentric relation therewith, and wherein said method includes the steps of: passing one of said two first threads through the eye of said first sewing needle, while passing another of said two first sewing threads through the eye of said second sewing needles; and then operating said sewing machine such that said one of said first threads is inserted into said each needle hole formed by said first sewing needle and entwined with said second thread therein, after which, said second sewing needle is inserted into said each needle hole in which said one of said two first threads has been entwined about said second thread, thereby causing said another of said two first sewing threads to entwine about said second thread in said each needle hole.

6. The method according to claim 5, wherein said predetermined feeding pitch is set to be 4 mm or less.

* * * * *